July 12, 1966 R. L. CURRIE 3,260,288
POWER OPERATED CHAIN SAW
Filed Nov. 12, 1963 5 Sheets-Sheet 1

INVENTOR.
ROBERT L. CURRIE
BY
Channing L. Richards &
Dalbert U. Shefte
ATTORNEYS July 12, 1966  R. L. CURRIE  3,260,288
POWER OPERATED CHAIN SAW
Filed Nov. 12, 1963  5 Sheets-Sheet 2

INVENTOR.
ROBERT L. CURRIE
BY
Channing P. Richardson
Dalbert U. Shefte
ATTORNEYS

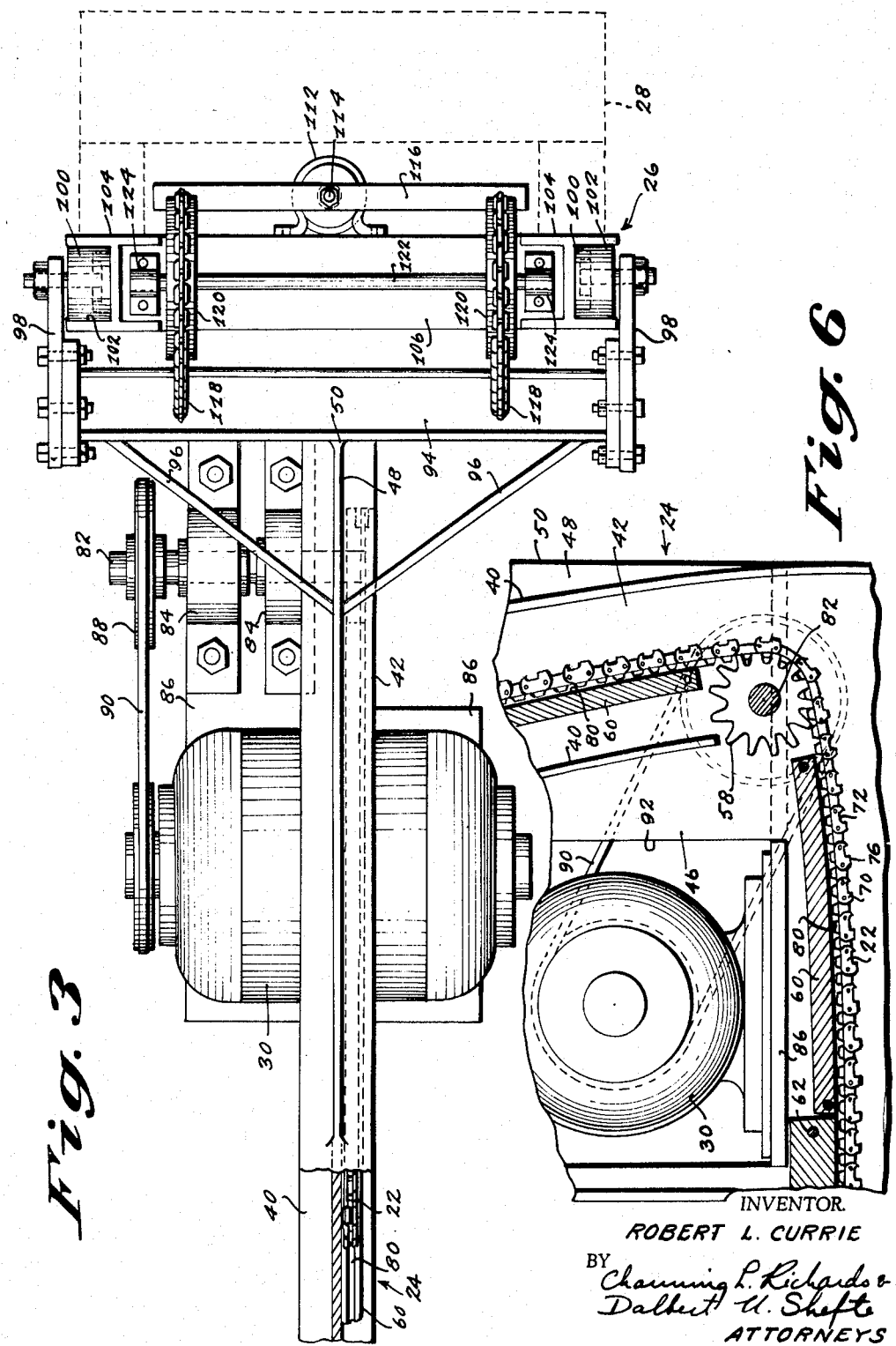

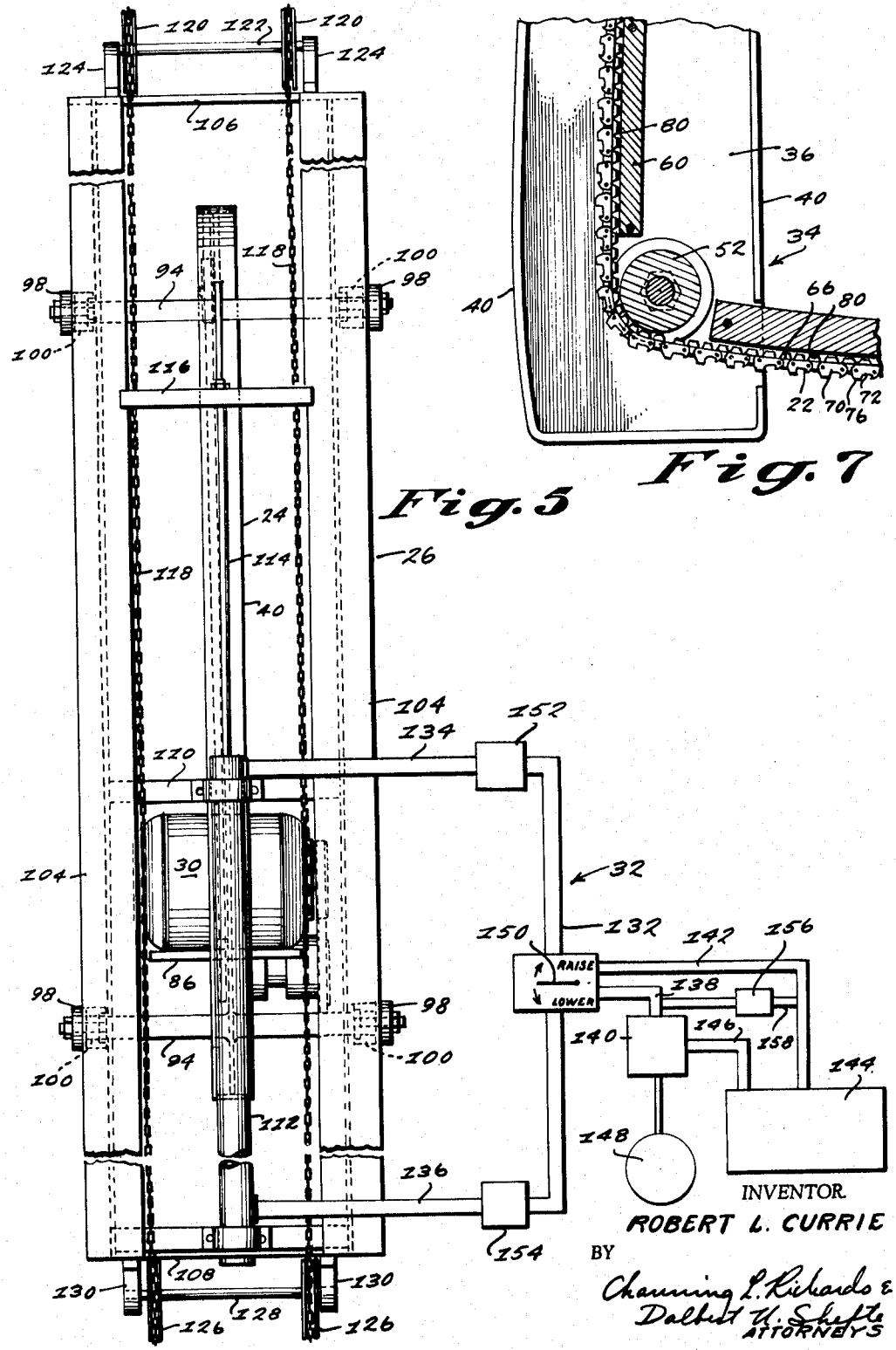

United States Patent Office 3,260,288
Patented July 12, 1966

3,260,288
POWER OPERATED CHAIN SAW
Robert L. Currie, 604 W. 20th St., Lumberton, N.C.
Filed Nov. 12, 1963, Ser. No. 322,997
6 Claims. (Cl. 143—32)

The present invention relates to a power driven chain saw with powered means for manipulating the saw with respect to the work. In particular, the present invention provides a chain saw having components uniquely arranged for simplicity, compactness and balance, such that the saw can be made with a large cutting capacity for cutting through a large stack of logs or other material in a single pass with efficient and easy manipulation by powered manipulating means.

Briefly described, the chain saw of the present invention has an endless saw chain mounted for circuitous movement in a substantially rectangular path on a saw supporting frame that has a large work receiving recess opening downwardly and extending to a substantial height, with the bottom reach of the saw chain extending across the opening of the recess to cut the work thereat and the upper reach of the chain extending across the frame above the recess so as to avoid return of the saw chain through the cut, which could cause binding, particularly with the deep cuts contemplated by the present invention. The path of the chain is offset outwardly at one end of the bottom reach to assure driving retention on a drive sprocket thereat, which retention is a particular problem where, as here, the chain path is generally rectangular and of substantial length to accommodate the large recess. The drive sprocket is simply driven by a motor carried on the frame, which mounting allows manipulation of the saw without requiring any complex drive connection to drive the saw during the extensive stroke of the frame, as would be necessary were the drive motor mounted independently of the frame.

The drive motor is compactly and efficiently mounted on the frame inwardly of the offset drive sprocket and chain adjacent the work receiving recess without restricting the rectangular size of the recess and importantly enhancing the balance of the frame and components carried thereby for ease of manipulation, which balance is particularly significant where, as here, the frame is of substantial size to provide a large capacity operation. Balance is further enhanced by this arrangement in that the drive motor can be mounted to extend through the frame for even distribution of the motor weight centrally of the plane of the frame.

The frame, along with the saw chain and drive motor carried thereby, is movably mounted on a standard with power means operative to move the frame on the standard to manipulate the saw for feeding into work and for retraction therefrom. Preferably, the power means is hydraulically operated with a speed control to govern the rate of descent of the large frame and with a pressure control to limit the pressure applied during feeding of the saw into the work.

With the present invention, a power saw of large capacity can operate to cut a truckload of logs into pulpwood lengths, without having to remove the logs from the truck or other retaining structure, by single passes that cut through the entire width and depth of the stacked logs, such that in but three passes an entire truckload of 8 to 10 cords of logs can be cut easily and efficiently into pulpwood lengths by a single operator in less than 10 minutes, where heretofore the same task has required the strenuous efforts of at least two men working over a prolonged period of time.

The features and advantages of the present invention are incorporated in the preferred embodiment described below, and illustrated in the accompanying figures, in which:

FIG. 3 is an enlarged fragmentary plan view, partially in section, of the right portion of the chain saw in FIG. 2;

FIG. 5 is a right end elevation of the chain saw of FIG. 1;

FIG. 6 is an enlarged, fragmentary, front elevation, partially in section, of the frame, chain, drive sprocket and chain drive motor of the saw of the preceding figures;

FIG. 7 is an enlarged, fragmentary, vertical sectional view of the lower left portion of the saw of FIG. 2;

Figure 1:
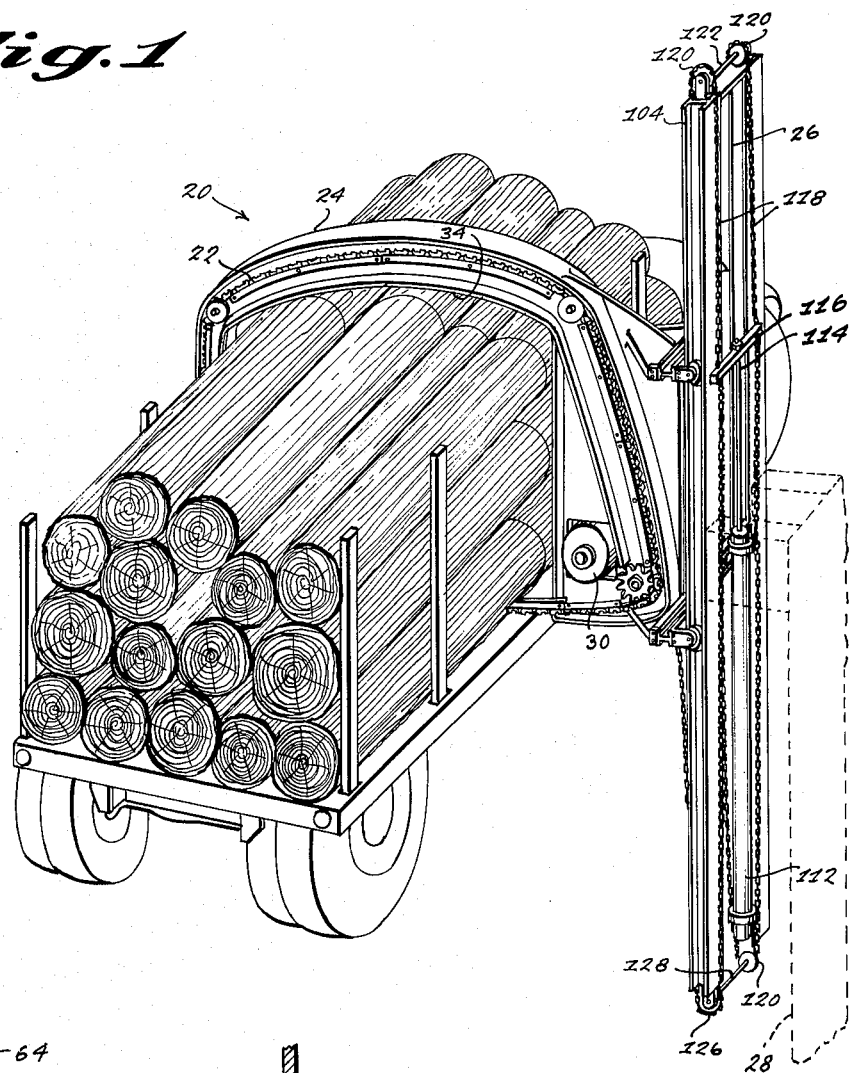
FIG. 1 is a perspective view of the preferred embodiment of the chain saw of the present invention, shown in operation to cut a truckload of logs.

The saw 20 of the embodiment illustrated in FIGS. 1–9 consists basically of a toothed saw chain 22 carried on a recessed supporting frame 24 that is movably mounted on a standard 26 fixed to a base 28. The saw chain 22 is driven by a chain drive motor 30 also carried by the frame 24, and the frame is manipulated on the standard 26 to feed and retract the saw chain by hydraulic power means 32 mounted on the standard and base 28. The base 28 may be of any conventional construction of sufficient size and weight for cantilever support of the standard 26 and frame 24, and therefore is shown only schematically in the drawings. In addition, the base 28 may serve conveniently as a housing for certain of the hydraulic power means components, as will be mentioned hereinbelow.

The saw supporting frame 24 is of substantial size for large capacity operation, and is generally in the form of an inverted U defining a work receiving recess 34 that opens downwardly and is of a width and height sufficient to accommodate therein the cross-section of an entire truckload of logs, as seen in FIG. 1. For this purpose, the recess 34 is generally rectangular with a height that may be as great or greater than the width, although it may of course be shaped to best suit the particular intended use of the saw.

For economy and ease of manipulation, the frame 24 is made as compact as possible with a relatively narrow outer leg 36 and top portion 38, which are reinforced by spaced, peripheral ribs 40 to provide the strength necessary to support the saw chain across the bottom of the recess at the substantial spacing resulting from the length of the top portion 38 and height of the outer leg 36. These ribs 40 also provide a channel on the front face of the frame, in which channel the saw chain 22 is positioned, with the ribs 40 continuing down along the inner leg 42 of the frame at an inclination away from the recess 34 to form a continuation of the channel in line with the below described offset path of the chain on the inner leg 42. The inner leg 42 has an additional rib 44 extending generally vertically from the top portion 38 adjacent the recess 34 to form the side of the recess generally parallel with the opposite side without being offset with the channel forming ribs 40, and an inner web plate 46 extends between the channel ribs 40 and the recess defining rib 44 to rigidify the frame 24 and significantly provide a mounting for the chain drive motor 30. A web plate 48 also extends outwardly from the inclined channel forming ribs 40, with this outer web 48 providing a vertical edge 50 on the frame 24 for attachment to the standard 26 as will be described below.

The saw chain 22, that is carried by the above-described frame 24, is an endless link-type chain trained around an idler pulley 52 rotatably mounted on the front face of the frame 24 at the bottom of the outer leg 36, an idler pulley 54 rotatably mounted on the front face of the frame at the juncture of the outer leg 36 and top portion 38, an idler pulley 56 rotatably mounted on the front face of the frame at the juncture of the top portion 38 and inner leg 42, and a drive sprocket 58 rotatably mounted on the front face of the frame at the bottom of the inner leg 42 and offset from the recess 34 and last mentioned idler pulley 56 but in general horizontal alignment with the first mentioned idler pulley 52. The pulleys and sprocket are mounted within the channel formed by the ribs 40 to provide a generally rectangular chain path except for the offset of the drive sprocket 58, which offset provides an increased purchase of the chain 22 on the drive sprocket to assure driving retention of the chain on the sprocket while positioning the bottom reach of the chain in a generally horizontal extent across the opening of the recess 34 for cutting work thereat. One of the idler pulleys, such as the pulley 52 at the bottom of the outer leg 36, may be adjustably mounted (not shown) conventionally for proper tensioning of the saw chain 22.

Figures 8, 9:
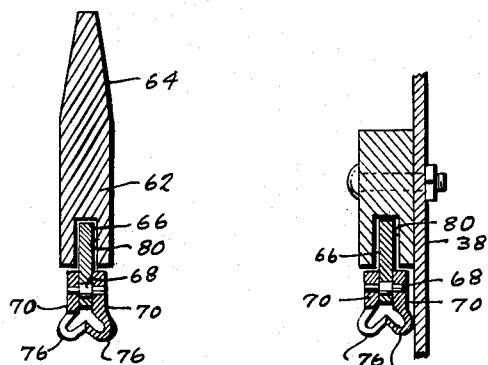
FIG. 8 is an enlarged vertical sectional view taken along line 8—8 of FIG. 2.
FIG. 9 is an enlarged vertical sectional view taken along line 9—9 of FIG. 2.

The saw chain 22 is supported on the frame 24 between the pulleys and sprockets by longitudinal guide tracks 60 bolted to the frame and slightly bowed to maintain contact with the chain 22. The guide tracks 60 also extend along the bottom of the inner web plate 46 in alignment with a cutter bar 62, which is also bolted to the frame and extends across the bottom of the recess with a slight downward bow to guide the chain through the cutting area. This cutter bar 62 is of sufficient height to provide beam strength for support of the chain 22 during cutting with the upper portion tapered, as at 64, to minimize binding in the cut made by the chain in the work (FIG. 8).

The saw chain 22 may be of any suitable conventional link-type. In the embodiment illustrated the saw chain has an inner series of drive links 66 to both sides of which are connected by hinge pins 68 a series of alternate cutting links 70 and spacer links 72. Each cutting link 70 has a leading depth gage portion 74 extending outwardly therefrom to control the depth of cut, and a trailing cutting tooth 76 shaped to make half of the cut to an outer extent sufficient for the cutter bar 62 to be accommodated in the cut.

The drive links 66 have inwardly extending drive lugs 78 shaped to be drivingly engaged by the drive sprocket 58 to drive the saw chain 22, with the drive sprocket being rotated to draw the chain across the recess 34 toward the sprocket. These drive lugs 78 also serve to position the chain on the cutter bar 62, guide tracks 60 and idler pulleys 52, 54 and 56, which bar, tracks and pulleys are each similarly grooved centrally, as at 80, for guiding receipt of the drive lugs 78 with the outer spacer and cutting links, 72 and 70, respectively, seated against the outer surfaces of the bar, tracks and pulleys adjacent the grooves 80.

The drive sprocket 58 is mounted on a horizontal sprocket shaft 82 that extends through the frame 24 and is rotatably mounted in a pair of bearings 84 attached to a horizontal mounting plate 86 secured to the frame 24. A drive pulley 88 is fixed to the sprocket shaft 82 rearwardly of the bearings 84 for driven connection by a belt 90 with the electric drive motor 30, which is also mounted on the mounting plate 86. The drive motor 30 is compactly mounted for balance inwardly of the offset chain 22 and drive sprocket 58 and, also for balance, the motor is centrally mounted with respect to the plane of the frame to extend on both sides thereof through an aperture 92 therein, with the mounting plate 86 similarly extending therethrough for support of the motor.

Figure 2:
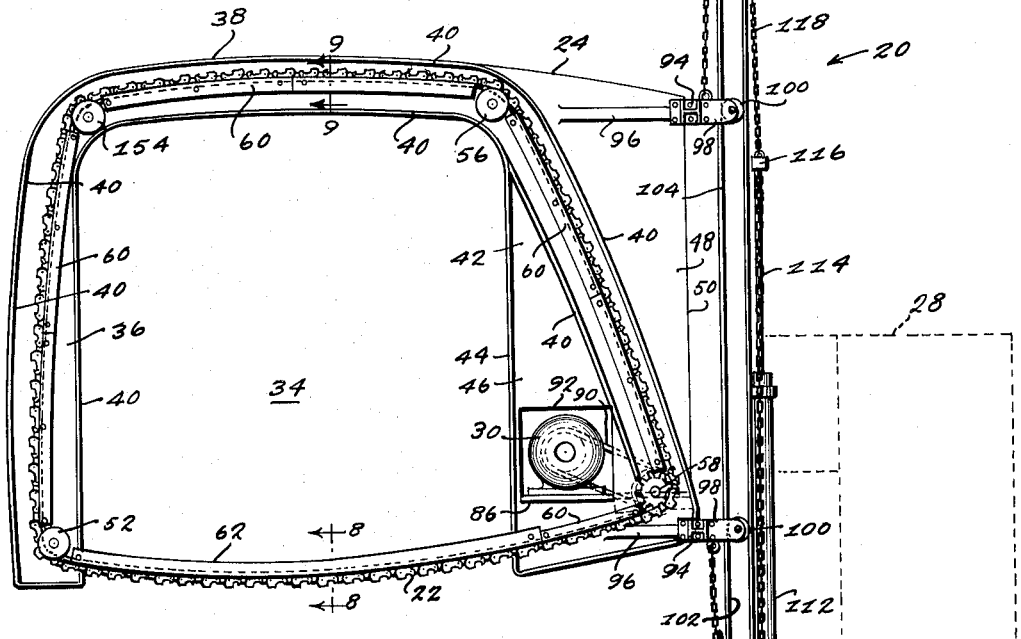
FIG. 2 is a front elevation of the chain saw of FIG. 1.
Figure 4:
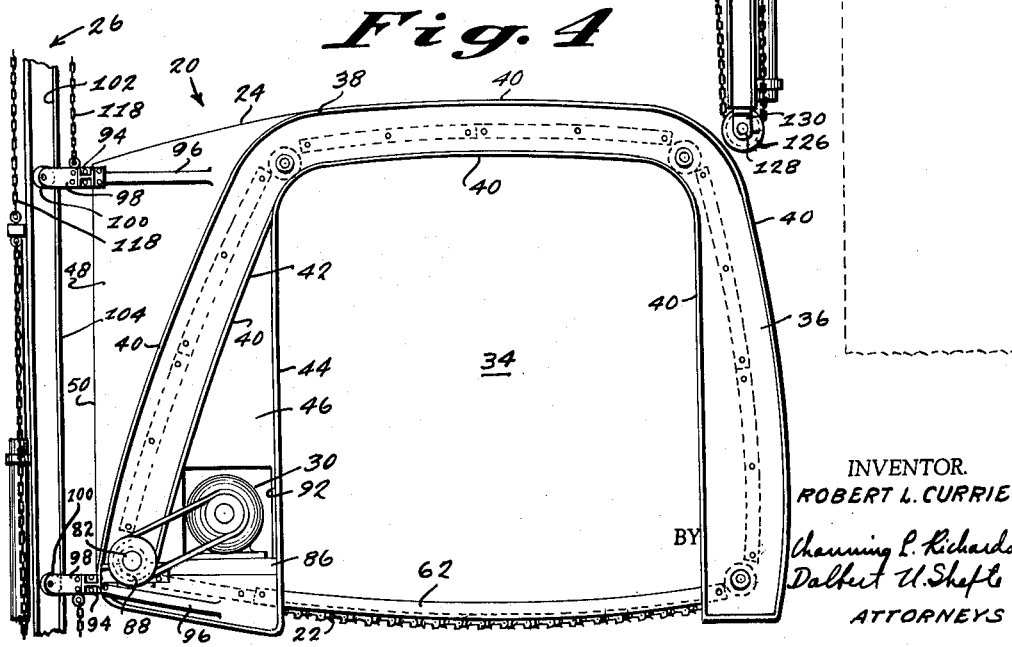
FIG. 4 is a rear elevation of the chain saw of FIG. 1.

For movable support of the saw frame 24 on the standard 26, the saw frame is provided with a pair of vertically spaced, transverse beams 94 secured to the aforementioned vertical edge 50 of the frame 24, with diagonal struts 96 extending from the beam ends to the frame inwardly of the vertical edge 50 for reinforcement. Each beam 94 has brackets 98 extending horizontally from the ends thereof away from the frame for mounting of inwardly facing opposite guide rolls 100 that are freely rotatable on the brackets 98. These guide rolls 100 are received in outwardly facing vertical channels 102 of spaced vertical H beams 104 of the standard 26. The vertical beams are secured in spaced relation by a top cross plate 106, a bottom cross plate 108 and an intermediate cross plate 110, with the thus formed standard 26 secured to the base 28 in any suitable manner, as by attachment of the vertical H beams 104 to the base intermediate their ends (FIGS. 1 and 2).

The saw supporting frame 24 is manipulated by a hydraulic piston-cylinder mechanism that has a cylinder 112 vertically mounted on the outer face of the standard by bracket attachment of its head end to the bottom cross plate 108 and its rod end to the intermediate cross plate 110. A piston rod 114 extends upwardly from the rod end of the cylinder 112 to a horizontal tie bar 116 that has its ends attached to a pair of spaced chains 118 that extend upwardly over a pair of top idler sprockets 120 mounted on a common shaft 122 supported in bearings 124 on the top cross plate 106. The chains 118 extend downwardly from the sprockets 120 along the inner face of the standard 26 to securement to the upper of the frame beams 94. The chains 118 also extend downwardly from the tie bar 116 around a pair of bottom idler sprockets 126 mounted on a common shaft 128 supported in bearings 130 on the bottom cross plate 108. From these bottom sprockets 126, the chains 118 extend upwardly along the inner face of the standard 26 to securement to the lower of the frame beams 94.

Thus, movement of the piston rod 114 in the cylinder 112 will cause movement of the chains 118 to raise or lower the saw frame 24 inversely, with the engagement of the guide rolls 100 in the vertical beam channels 102 maintaining the saw frame in planar alignment.

The hydraulic system for operating the piston-cylinder mechanism to manipulate the saw frame 24 may consist of conventional components arranged as will now be described with reference to the schematic illustration at the right in FIG. 5. These components may be conveniently mounted on the base 28. The system includes a four-way, three position, manually operable valve 132 from which a conduit 134 leads to the rod end of the cylinder 112, a conduit 136 leads to the head end of the cylinder, a conduit 138 leads to a hydraulic pump 140 and a conduit 142 leads to a reservoir tank 144, which is connected by a conduit 146 to the pump 138. The pump 138 is driven by a conventional motor 148 at a controlled rate to provide a desired pressure and flow rate through the system.

The four-way, three position, manually operable, control valve 132 has a neutral position in which the pump conduit 138 and reservoir tank conduit 142 are connected for non-operating, recirculating flow, with the rod end conduit 134 being closed by the valve to maintain fluid pressure above the piston to prevent the frame 24 from moving downwardly from a stopped position, and the head end conduit 136 being open to the pump and tank conduits to relieve pressure in the head end of the cylinder below the piston to avoid creeping.

The control valve 132 is shiftable from this neutral position by manual operation of the lever 150 to saw frame raising position in which the pump conduit is in line with the rod end conduit 134 and the tank conduit 142 is in line with the head end conduit 136 so that fluid will be pumped into the cylinder 112 above the piston and will be withdrawn from below the piston to lower the piston rod 114 and, through the chains 118, raise the saw frame 24.

Shifting of the lever 150 to the opposite position reverses the conduit connections so that fluid is pumped to the head end of the cylinder and is withdrawn from the rod end to raise the piston rod 114 and thereby lower the saw frame 24. To control the rate of descent of the saw frame 24 and avoid too rapid a descent, a flow regulator valve 152 is provided in the rod end conduit 134. This flow regulator valve 152 is manually settable to a desired flow rate for a selected rate of descent, and includes a check valve by-pass to allow free flow therethrough in the opposite, or frame raising, direction. To control the fluid pressure applied to the piston in the frame lowering direction to avoid a hazardous pressure being applied when the saw is feeding into the work or is otherwise resisted in its downward motion, a pressure reducing valve 154 is provided in the head end conduit 136 to regulate the saw lowering pressure. This reducing valve 154 is manually settable to a desired maximum pressure, and includes a check valve by-pass to allow full pressure passage of fluid in the opposite, or frame raising, direction.

To avoid undue pressure build-up in the system for any reason, a relief valve 156 is provided in a by-pass conduit 158 between the pump conduit 138 and tank conduit 142.

The saw 20, as described above, is placed in operation by first starting the saw chain drive motor 30 and the hydraulic pump motor 148, both of which run continuously and independently during operation of the saw. The saw frame 24 is then raised, if necessary, to permit positioning of logs thereunder by manually operating the main valve lever 150 to the raise position, which manipulates the main valve 132 to connect the pump to the rod end of the cylinder and the reservoir tank to the head end of the cylinder to force the piston rod 114 downwardly and thereby raise the saw frame. When the saw frame is properly positioned, the lever is returned to neutral to stop the frame and retain it in its raised position. A truck loaded with logs is then driven under the frame to position the logs for cutting, which cutting is accomplished by turning the lever to its lowering position for manipulation of the valve to connect the pump to the head end of the cylinder and the reservoir tank to the rod end of the cylinder, causing the piston rod to move upwardly to lower the saw frame, with the flow regulator valve 152 controlling the rate of descent of the saw frame. When the saw chain 22 engages the logs and begins cutting, the hydraulic system causes the saw to press against the logs to feed the saw into the logs, with the pressure reducing valve 154 limiting the pressure such that the pressure cannot build up to a dangerous level when the descent of the frame is slowed or even stopped during cutting.

When the cut has been completed, the control level 150 is again shifted to raise position to raise the saw frame above the logs to permit the truck to advance for positioning the logs for the next cut.

The cycle of operation is then repeated until the entire load of logs has been cut into desired lengths.

If desired, the base 28 may be movably mounted for moving the saw frame between cuts with the truck remaining in its original position. Also, the logs may be stacked on some other device, rather than on a truck.

Various modifications of the components of the above described saw 20 may be made within the scope of the present invention. For example, the above-described reinforcing ribs 40 and 44 could be eliminated if the frame 24 itself were made of sufficient strength to withstand the stresses without reinforcement.

Figure 10:
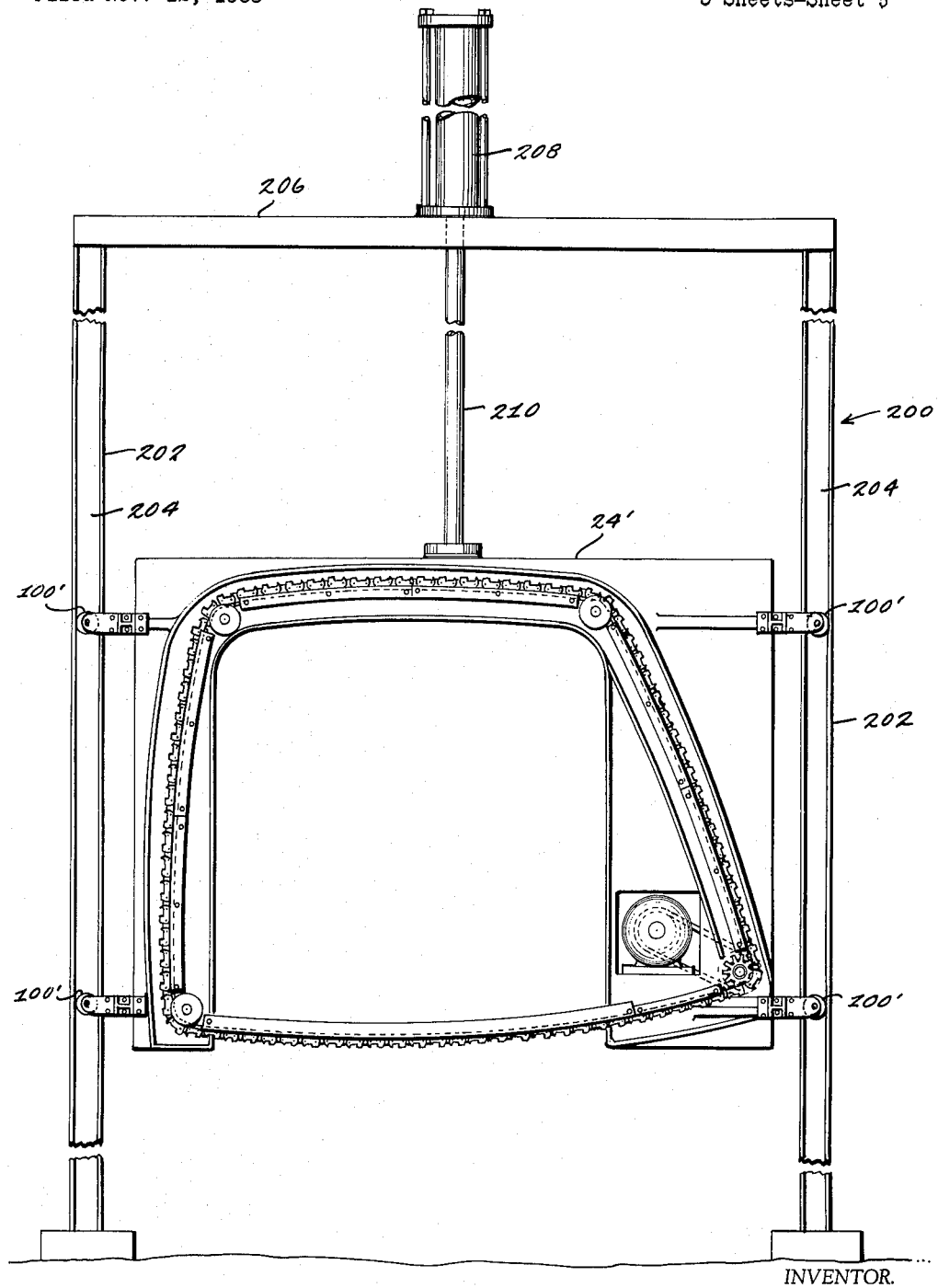
FIG. 10 is a front elevational view of an alternate embodiment of the saw of the present invention.

Also, the standard and base may be modified as shown in FIG. 10, wherein the saw frame 24' and components carried thereby are substantially identical to the corresponding elements of the embodiment of FIGS. 1–9. In this alternate embodiment, a frame supporting structure 200 supports the saw frame 24' between a pair of vertical leg portions 202, each of which is in the form of a vertical H beam providing channels 204 in which guide rolls 100' extending from both ends of the saw frame 24' are engaged in the same manner as the guide rolls 100 of the embodiment of FIGS. 1–9 engage in the channels 102 of the base 28. The supporting structure is completed by a horizontal cross bar 206 secured to the tops of the leg portions 202. This cross bar 206 also serves as a mounting for a cylinder 208 from which a piston rod 210 depends for securement to the top of the saw frame 24'. The piston rod 210 is manipulated to raise and lower the saw frame 24' by hydraulic means, such as that of the embodiment of FIGS. 1–9, in a similar operating sequence.

For even greater capacity, a saw of the present invention, such as that of FIG. 10, could be made with a plurality of saw frames arranged in a bank for simultaneous operation. Thus a bank of six parallel saw frames could be arranged for simultaneously cutting a load of logs 35 to 40 feet long into pulpwood lengths in a single manipulation, which would require less than two minutes to complete the entire cut.

The present invention has been described in detail above for purposes of illustration only and is not intended to be limited by this description or otherwise, except as defined in the appended claims.

I claim:

1. A large capacity, power operated, chain saw capable of cutting through a large stack of logs or other material in a single pass, said saw comprising an elongated standard, a saw chain supporting frame mounted on said standard for movement therealong and having a generally rectangular recess of substantial breadth transverse to the direction of movement and substantial depth parallel to the direction of movement with an open end facing in the direction of movement for receipt of logs or other material therein, a drive sprocket rotatably mounted on said frame laterally offset from said recess open end, an endless saw chain supported on said frame for circuitous movement in an endless path extending across said recess open end, around said offset drive sprocket and around said frame outwardly adjacent said recess for cutting of logs or other material at said recess open end and return around said frame outwardly of said recess, a chain drive motor mounted on said frame between said recess and the portion of the chain path offset by the drive sprocket and drivingly connected to said sprocket for driving of said saw chain, and power means for moving said frame along said standard to advance and retract said saw frame with respect to the logs or other material to be cut.

2. A large capacity, power operated, chain saw according to claim 1 and characterized further in that said endless chain extends adjacent said rectangular recess in a generally correspondingly rectangular path except for a portion inclinedly offset by said drive sprocket, and said drive motor is mounted on said frame interiorly of said inclinedly offset chain path portion.

3. A large capacity, power operated, chain saw according to claim 2 and characterized further in that said drive motor extends transversely through said frame and is centrally mounted with respect thereto for balance thereon to facilitate movement of the frame by said power means.

4. A large capacity, power operated, chain saw according to claim 1 and characterized further in that said drive motor extends transversely through said frame and is centrally mounted with respect thereto for balance thereon to facilitate movement of the frame by said power means.

5. A large capacity, power operated, chain saw capable of cutting through a large stack of logs or other material in a single pass, said saw comprising a vertically elongated standard, a saw chain supporting frame mounted in a vertical plane on said standard and vertically movable thereon, said frame having a vertically disposed generally rectangular recess of substantial horizontal breadth and substantial vertical depth with an open bottom end for receipt of logs or other material therein upon downward movement of said frame, a drive sprocket rotatably mounted on said frame laterally offset from said recess open end, an endless saw chain supported on said frame for circuitous movement in an endless path extending across said recess open end, around said offset drive sprocket and around said frame outwardly adjacent said recess for cutting of logs or other material at said recess open end and return around said frame outwardly of said recess, a chain drive motor mounted on said frame between said recess and the portion of the chain path offset by the drive sprocket and drivingly connected to said sprocket for driving said chain, and power means for moving said frame vertically along said standard to advance and retract said saw frame with respect to the logs or other material to be cut.

6. A large capacity, power operated, chain saw according to claim 5 and characterized further in that said drive motor extends transversely through said frame and is centrally mounted with respect to the vertical plane thereof for balance thereon to facilitate movement of the frame by said power means.

References Cited by the Examiner

UNITED STATES PATENTS

| | | | |
|---|---|---|---|
| Re. 24,129 | 3/1856 | Hassler | 143—32 X |
| 846,663 | 3/1907 | Granbery | 143—32 |
| 973,258 | 10/1910 | Cannon | 143—32 |
| 1,061,702 | 5/1913 | Taggart | 143—32 |
| 2,795,933 | 6/1957 | McCallum | 143—32 |
| 2,932,229 | 4/1960 | Crane | 143—46 X |

DONALD R. SCHRAN, *Primary Examiner.*